(12) United States Patent
Youngs et al.

(10) Patent No.: US 7,244,383 B2
(45) Date of Patent: Jul. 17, 2007

(54) METHOD OF FORMING A VEHICLE COMPONENT

(75) Inventors: John D. Youngs, Southgate, MI (US); Glenn A. Cowelchuk, Chesterfield, MI (US); Michael P. Schoemann, Waterford, MI (US); Randy S. Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 261 days.

(21) Appl. No.: 10/829,731

(22) Filed: Apr. 22, 2004

(65) Prior Publication Data

US 2005/0238828 A1  Oct. 27, 2005

(51) Int. Cl.
*B29C 45/14* (2006.01)

(52) U.S. Cl. ............... 264/255; 264/273; 264/279; 296/37.13

(58) Field of Classification Search ............. 264/328.1, 264/242, 255, 328.9, 328.8, 241, 273, 279; 296/37.13
See application file for complete search history.

(56) References Cited

U.S. PATENT DOCUMENTS

| 5,072,983 | A |   | 12/1991 | Muroi et al. |
| 5,261,716 | A |   | 11/1993 | Phelps |
| 5,342,009 | A | * | 8/1994  | Lehner .................... 248/311.2 |
| 5,535,571 | A | * | 7/1996  | Nichols ................... 296/37.13 |
| 5,618,485 | A | * | 4/1997  | Gajewski ..................... 264/255 |
| 5,795,005 | A |   | 8/1998  | Garfias et al. |
| 5,899,522 | A |   | 5/1999  | DeRees et al. |
| 6,116,672 | A |   | 9/2000  | Cannon et al. |
| 6,120,077 | A |   | 9/2000  | Westphal et al. |
| 6,328,191 | B1 | * | 12/2001 | Conley et al. .............. 224/563 |
| 6,334,562 | B1 | * | 1/2002  | Ament et al. ............... 224/563 |
| 6,471,276 | B1 |   | 10/2002 | Brunsman et al. |
| 6,756,004 | B2 | * | 6/2004  | Davis et al. ................ 264/255 |

* cited by examiner

*Primary Examiner*—Jill L. Heitbrink
(74) *Attorney, Agent, or Firm*—MacMillan, Sobanski & Todd, LLC

(57) ABSTRACT

A method of manufacturing a vehicle trim panel having a storage compartment includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate. A second material is introduced into the second cavity, such that the second material defines a flexible member. The substrate and the flexible member define a vehicle trim panel, such that the flexible member defines an expandable portion of the storage compartment.

7 Claims, 2 Drawing Sheets

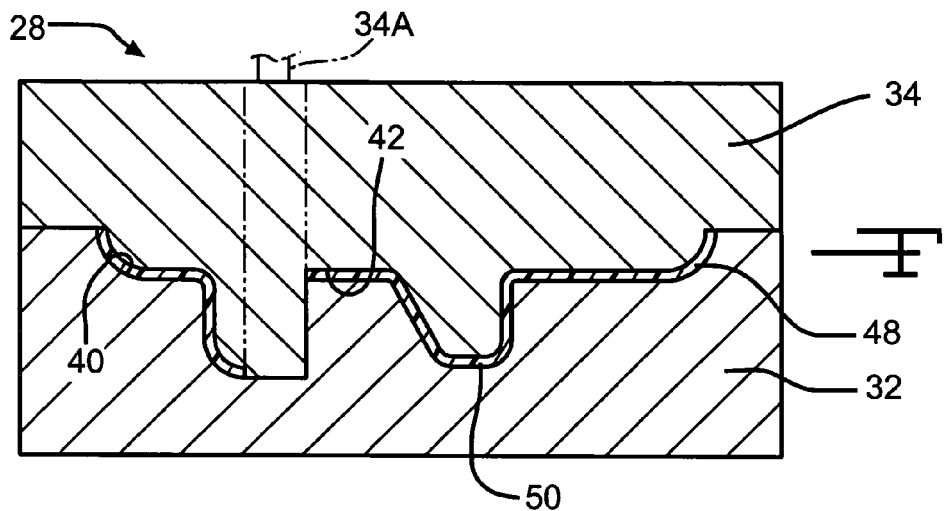
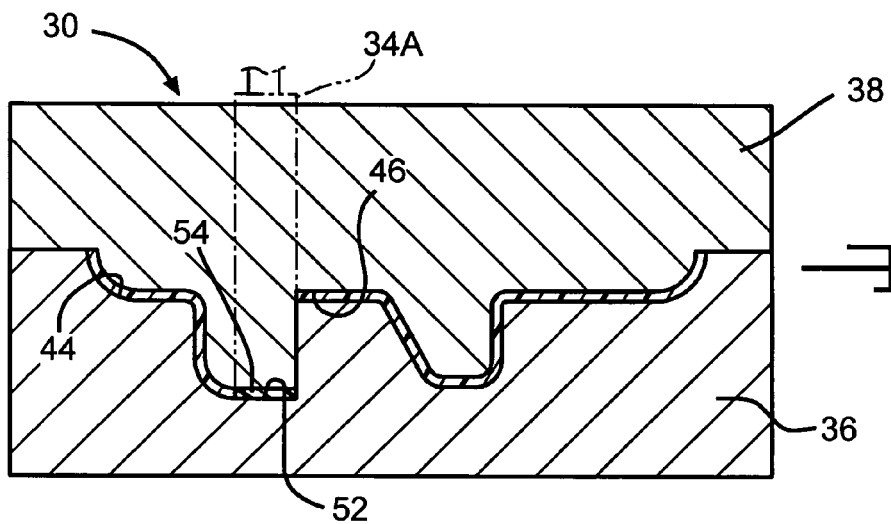
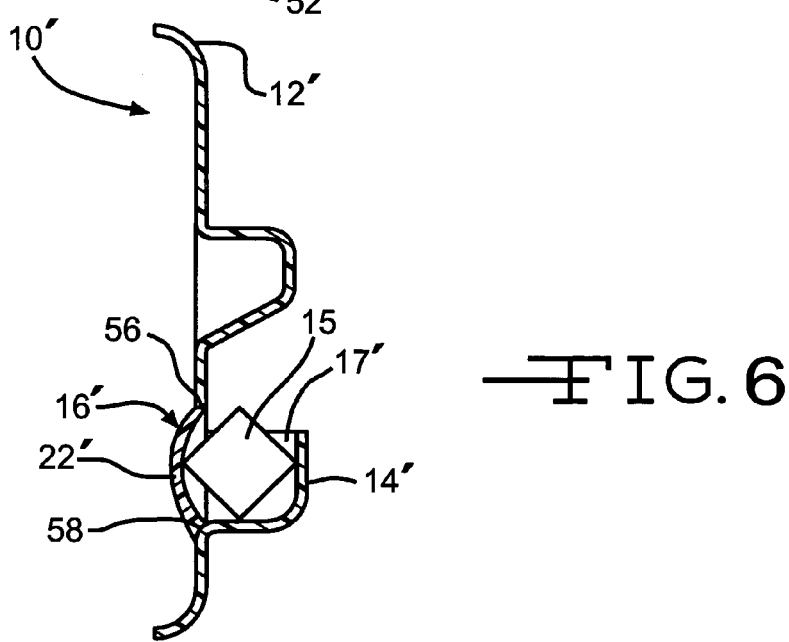

METHOD OF FORMING A VEHICLE COMPONENT

TECHNICAL FIELD

This invention relates to interior vehicle components. More particularly, the invention relates to a method of manufacturing a vehicle trim panel having a storage compartment for holding an article.

BACKGROUND OF THE INVENTION

It is known to provide an interior trim panel for a vehicle, and components thereof, which is aesthetically and /or tactilely pleasing to the vehicle occupants. Such trim panels may include a cavity, such as a map pocket, having an expandable panel which can expand to provide for storage of articles of various sizes.

Known flexible panels are typically formed separately from the trim panel and assembled to the trim panel during an assembly operation subsequent to forming the trim panel. Such assembly operations can be complex and time consuming. It would therefore be desirable to provide an improved method of manufacturing an expandable panel for a cavity formed in an interior vehicle trim panel.

SUMMARY OF THE INVENTION

This invention relates to an improved method of manufacturing a vehicle trim panel having a storage compartment. The method includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate. A second material is introduced into the second cavity, such that the second material defines a flexible member. The substrate and the flexible member define a vehicle trim panel, such that the flexible member defines an expandable portion of the storage compartment.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is a schematic cross sectional view showing the substrate illustrated in FIG. 1 in a first mold assembly used in accordance with the method of the invention.

FIG. 5 is a schematic cross sectional view showing the flexible member and the substrate illustrated in FIG. 1 in a second mold assembly used in accordance with the method of the invention.

FIG. 6 is a partial cross sectional view of a first alternate embodiment of a vehicle trim panel manufactured in accordance with the method of the invention.

DETAILED DESCRIPTION OF THE INVENTION

Figure 1:
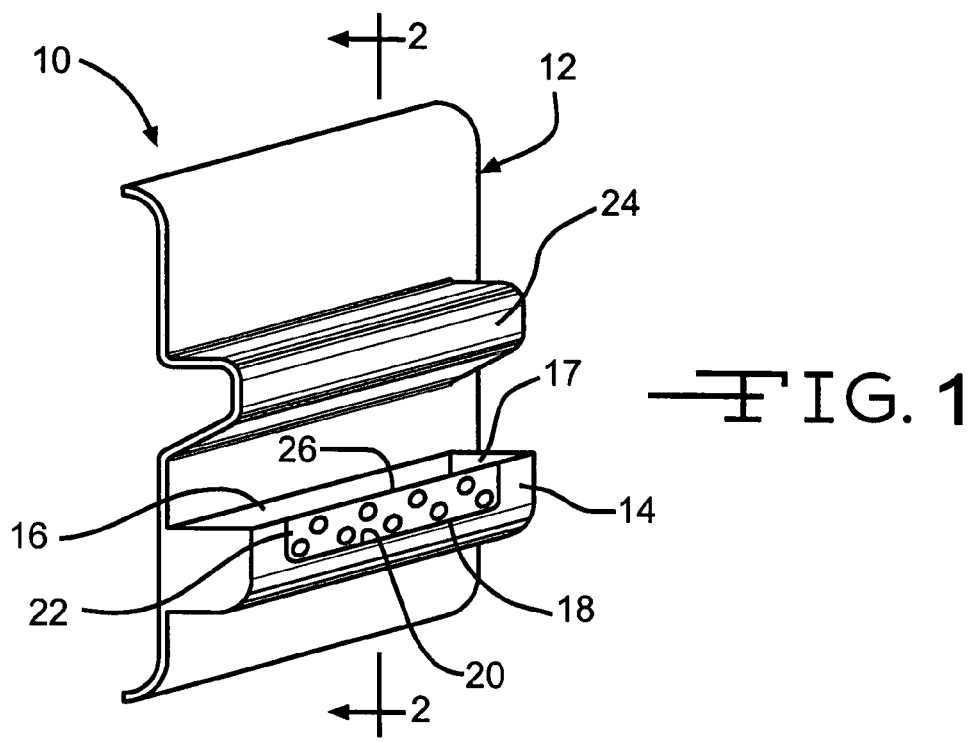
FIG. 1 is a perspective view of a vehicle trim panel manufactured in accordance with the method of the invention.
Figure 2:
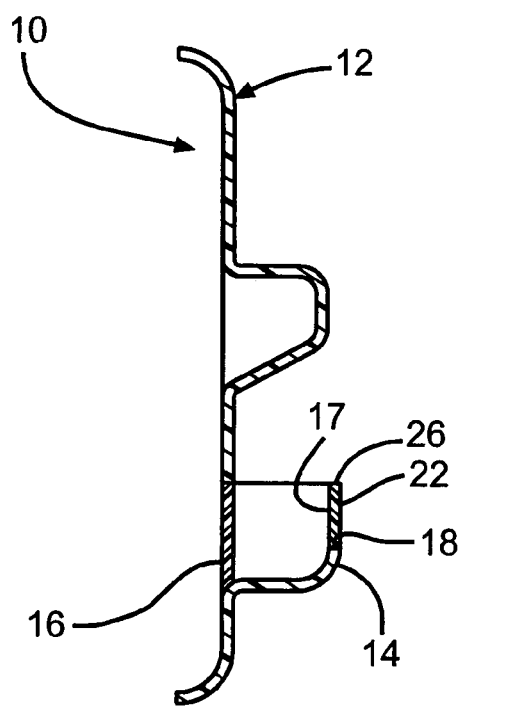
FIG. 2 is a partial cross sectional view of the vehicle trim panel taken along line 2—2 of FIG. 1.
Figure 3:
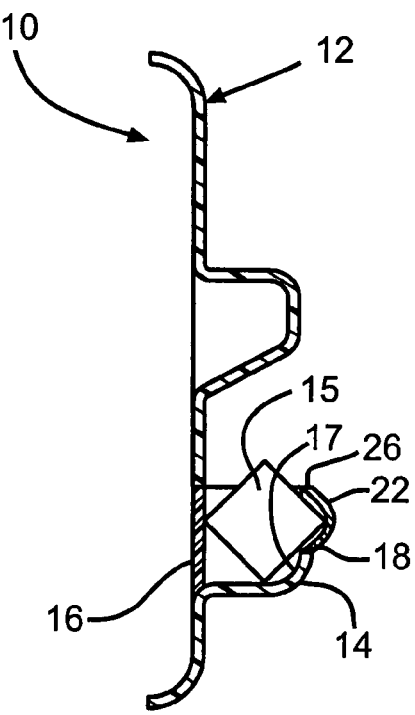
FIG. 3 is a partial cross sectional view of the vehicle trim panel illustrated in FIG. 2, showing the flexible panel expanded to accommodate an article.

Referring now to the drawings, there is illustrated in FIGS. 1 through 3, inclusive, a vehicle trim panel, generally shown at 10. In the exemplary embodiment illustrated, the trim panel 10 is an automotive door trim panel 10 which mounts to a vehicle door assembly (not shown). It will be appreciated however, that the trim panel 10 of the subject invention may be any desired vehicle trim panel, such as a center console, an instrument panel, a cup holder, and the like.

The door panel 10 includes a substrate 12. The substrate 12 includes front wall 14 and a rear wall 16. The front and rear walls 14 and 16 define a storage compartment 17. The front wall 14 includes an inner edge 18 which defines an opening 20. A flexible member 22 is attached within the opening 20. Preferably, the flexible member 22 is integrally molded within the opening 20 according to the method of the invention, as will be described herein below. Preferably, the flexible member 22 defines a portion of the front wall 14 of the storage compartment 17. If desired, the flexible member 22 can define a portion of the rear wall 16, as best shown in FIG. 6.

In the exemplary embodiment illustrated, the substrate 12 includes an armrest 24. As best shown in FIG. 1, the opening 20 is substantially U-shaped having an open end 26. It will be understood however, that the opening can have any desired shape, such as, for example, a substantially rectangular shape or substantially oval shape.

Referring now to FIGS. 4 and 5, there is illustrated a first mold assembly 28, and a second mold assembly 30, respectively, which are adapted to be used in accordance with the method of this invention. Preferably, the first mold assembly 28 includes a first mold section 32 and a second mold section 34, as shown in FIG. 4. The second mold assembly 30 includes a third mold section 36 and a fourth mold section 38, as shown in FIG. 5. Preferably, the first mold section 32 functions as the third mold section 36, as will be described herein. The first mold section 32 includes a first mold surface 40, the second mold section 34 includes a second mold surface 42, the third mold section 36 includes a third mold surface 44, and the fourth mold section 38 includes a fourth mold surface 46.

Although illustrated schematically in FIGS. 4 and 5, it will be appreciated that the mold surfaces 40, 42, 44, and 46 may be of any desired shape and contour. The mold sections 32, 34, 36, and 38 are preferably mounted to platens (not shown) of a press (not shown), such as a vertical molding press with sufficient tonnage to accomplish the method herein described.

It will be appreciated, that in accordance with each embodiment of the invention as will be described below, a first step of the method of the invention includes providing a suitable mold assembly or assemblies, such as the mold assemblies 28 and 30, respectively illustrated in FIGS. 4 and 5.

A second step of the method of this invention is illustrated generally in FIG. 4. In the second step, the first mold assembly 28 is moved to a first closed position, as viewed in FIG. 4. In the first closed position, the first mold section 32 and the second mold section 34 define a first cavity 48. A first material 50 is then introduced into the first cavity 48. Any desired material can be introduced into the first cavity 48. Preferably the first material 50 is molten plastic, such as polypropylene or glass-filled polypropylene. It will be understood that any other desired thermoplastic can be used.

The first material 50 then conforms to the shape of the first cavity 48, thereby forming the substrate 12. The first mold section 32 and the second mold section 34 are then moved away from one another.

A third step of the method of this invention is illustrated generally in FIG. 5. In the third step, the third mold section 36 and the fourth mold section 38 are moved into contact with one another and into a second closed position, thereby enclosing the substrate 12, and defining the second mold assembly 30. Preferably however, the substrate 12 remains in the first mold section 32 and the first mold section 32 and the fourth mold section 38 are moved into contact with one another and into the second closed position, thereby defining the second mold assembly 30.

In the second closed position, the third mold section 36 and the fourth mold section 38 define a second cavity 52. A second material 54 is then introduced into the second cavity 52. Any desired material can be introduced into the second cavity. Preferably, the second material 54 is molten plastic. More preferably, the second material 54 is a flexible material, such as a thermoplastic elastomer (TPE), thermoplastic elastomer-ether-ester (TEEE), or ethylene propylene diene monomer (EPDM). It will be understood that any other desired materials, such as other elastomers and non-elastomers, can be used. The second material 54 then conforms to the shape of the second cavity 52, thereby forming the flexible member 22.

When such a flexible member 22 formed of a flexible TPE defines a portion of the front wall 14 of the storage compartment 17 as shown in FIGS. 1 through 3, the flexible member 22 defines an expandable portion of the storage compartment 17. As used herein, expandable is defined as inwardly or outwardly (to the right as shown in FIG. 3) movable such that the volume of the storage compartment 17 is increased. For example, when an object 15 which is larger than the storage compartment 17 is placed within the storage compartment 17, the flexible member 22 expands outwardly, as shown in FIG. 3.

Preferably, the flexible member 22 becomes chemically bonded to the substrate 12 during the molding process to form the door panel 10. However, such chemical bonding is not required. For example, features, such as recesses and protrusions, can be provided on a mold surface, such as the second mold surface 42 of the second mold section 34 to form corresponding recesses and protrusions in a surface of the substrate 12 adjacent the opening 20. Such recesses and protrusion will provide a mechanical bond with the flexible member 22 after the molten second material hardens to form the flexible member 22. Alternately, holes or recesses can be formed in the substrate 12, such that the second material 54 fills the recesses. The second material 54 thereby becomes bonded to the substrate 12 when the second material 54 hardens within the recesses.

The third mold section 36 and the fourth mold section 38 are then moved away from one another and the door panel 10 is removed from the second mold assembly 30. It will be appreciated that the method of the invention can be performed with satisfactory results in a shuttle-mold wherein the second and fourth mold sections 34 and 38 move relative to a stationary first mold section 32. The method of the invention can also be performed with satisfactory results in a shuttle-mold wherein the first mold section 32 moves relative to stationary second and fourth mold sections 34 and 38, or wherein the all mold sections 32, 34, 36, and 38 move relative to one another.

A second embodiment of the method of the invention is also illustrated generally in FIGS. 4 and 5. According to the second embodiment of the method, the fourth mold section 38 preferably defines the second mold section 34. Preferably, the third mold section 36 defines the first mold section 34. The second mold section 34 includes a movable mold core, or movable portion, illustrated by a phantom line 34A. The movable portion 34A of the second mold section 34 is movable between a first position to obstruct the second cavity 52, as shown in FIG. 4, and a second position to expose the second cavity 52, as shown in FIG. 5.

The movable portion 34A of the second mold section 34 is positioned in its first position. The first material 50 is then introduced into the first cavity 48. The first material 50 then conforms to the shape of the first cavity 48, thereby forming the substrate 12, as described in detail herein. The movable portion 34A of the second mold section 34 is then positioned in its second position. The second material 54 is then introduced into the second cavity 52. The second material 54 then conforms to the shape of the second cavity 52, thereby forming the flexible member 22, as described in detail herein. Preferably, the flexible member 22 becomes chemically bonded to the substrate 12 during the molding process to form the door panel 10.

Preferably, the door panel 10 is manufactured using a two-shot molding process. The two-shot molding process may be accomplished by rotating the first mold section 32, such as in a rotational molding process. In such a rotational molding process, the substrate 12 is first injection molded in the first mold assembly 28 as described herein. The first mold section 32, containing the substrate 12 is then rotated to a second position wherein the first mold section 32 is joined with the fourth mold section 38 to define the second mold assembly 30 and the second cavity 52. The flexible member 22 is then injection molded in the second cavity 52. Alternately, two separate molds could be used sequentially to form the substrate 12 and the flexible member 22.

It will be further appreciated that the method of forming the door panel 10 of the invention can be satisfactorily performed wherein the flexible member 22 is formed prior to the substrate 12.

The method of forming a vehicle door panel 10 having a storage compartment 17 as described herein, and the door panel 10 formed thereby, is advantageous over prior art designs. The method of forming a vehicle door panel 10 is advantageous because the two-shot molding process eliminates the manual assembly of a flexible member to a door panel required by the prior art methods. The method of the invention further improves quality, and eliminates the multiple components, such as support frames, fasteners, adhesives, and the like, of known vehicle trim panels.

Referring now to FIG. 6, it will also be appreciated that the flexible member 22' can be formed at any desired location on the door panel 10'. For example, the rear wall 16' can include an inner edge 56 which defines a rear opening 58. The flexible member 22' can then be formed within the rear opening 58 according to the method of the invention and as herein above. Preferably, the flexible member 22' defines a portion of the rear wall 16' of the storage compartment 17'. It will be further appreciated that, if desired, the flexible member 22' can define a portion of both the front wall 14, 14' (as best shown in FIGS. 2 and 3) and a portion of the rear wall 16, 16' (as best shown in FIG. 6).

When an object, such as the object 15, which is larger than the storage compartment 17', is placed within the storage compartment 17', the flexible member 22' expands outwardly (to the left as shown in FIG. 6.)

Although the storage compartment 17 has been described herein as a vehicle map pocket, it will be appreciated that the storage compartment can be any other desired storage compartment. A storage compartment according to the method of the invention can include any support structure for supporting an object comprising at least one flexible member defining a retaining member. For example, such a storage compartment may include a support surface formed in the substrate for vertically supporting an object, such as a cup, a beverage can, or a wireless telephone, and a flexible member or strap. Preferably, the flexible strap is integrally formed with the substrate as herein described above, such that the strap and the substrate define an opening for securing the object between the substrate and the strap.

The principle and mode of operation of this invention have been described in its preferred embodiments. However, it should be noted that this invention may be practiced otherwise than as specifically illustrated and described without departing from its scope.

What is claimed is:

1. A method of manufacturing a vehicle trim panel having a storage compartment, the method comprising the steps of:
    (a) providing a substantially rigid substrate having at least two spaced apart and substantially parallel walls defining a storage compartment therebetween, at least one of the walls having an opening provided therethrough; and
    (b) molding a flexible material within the opening of the wall, wherein the flexible material completely fills the opening and defines an expandable portion of the storage compartment, thereby forming the vehicle trim panel having a storage compartment.

2. The method defined in claim 1 wherein the substantially rigid substrate and the expandable portion are formed in a two-shot injection molding process.

3. The method defined in claim 1 wherein one of the substantially rigid substrate and the expandable portion is formed prior to the other of the substantially rigid substrate and the expandable portion.

4. The method defined in claim 1 wherein the substantially rigid substrate is formed from a first material and wherein the flexible material is formed from a second material that is different from the fir st material.

5. The method defined in claim 1 wherein the storage compartment is a map pocket.

6. The method defined in claim 1 wherein the flexible material is chemically bonded to the substantially rigid substrate.

7. The method defined in claim 1 wherein step (a) is performed by providing a substantially rigid substrate including a first wall, a second wall that is substantially parallel to the first wall, and a bottom wall that extends between the first and second walls, wherein the second wall has the opening provided theretbrough.

* * * * *